United States Patent [19]

Harrison

[11] Patent Number: 4,563,022
[45] Date of Patent: Jan. 7, 1986

[54] VEHICLE SUSPENSION SYSTEMS

[75] Inventor: Anthony W. Harrison, Birmingham, England

[73] Assignee: Lucas Industries Public Limited Company, Birmingham, England

[21] Appl. No.: 545,826

[22] Filed: Oct. 27, 1983

[30] Foreign Application Priority Data

Nov. 2, 1982 [GB] United Kingdom ................ 8231339

[51] Int. Cl.⁴ .............................................. B60G 3/12
[52] U.S. Cl. ................................ 280/708; 267/15 R; 280/688; 280/6 R
[58] Field of Search ................ 260/6 R, 702, 708, 709, 260/711, 688; 267/15 R, 113

[56] References Cited

U.S. PATENT DOCUMENTS

| 1,906,469 | 5/1933 | Messier | 280/124 |
| 2,877,010 | 3/1959 | Gouirand | 267/15 |
| 3,395,931 | 8/1968 | Piret | 280/124 |
| 3,433,493 | 3/1969 | Hirst | 280/6 R |
| 3,527,467 | 9/1970 | Scott et al. | 280/6 R |
| 3,820,813 | 6/1974 | Moulton et al. | 267/57 |

FOREIGN PATENT DOCUMENTS

| 2079967 | 11/1971 | France . |
| 2292603 | 6/1976 | France . |
| 786429 | 11/1957 | United Kingdom . |
| 1192082 | 5/1970 | United Kingdom . |

Primary Examiner—Richard A. Bertsch
Attorney, Agent, or Firm—Oldham, Oldham & Weber Co.

[57] ABSTRACT

A vehicle suspension system for a pair of wheels has two torsionally stiff members each of which carries an axle for a respective wheel. The load on each wheel is supported by a gas spring to which relative movement of the wheel and vehicle body is transmitted. The springs are mounted in respective members which are connected to the body, and lever mechanisms are provided to transmit the relative movement of the wheel and body to the springs, the lever mechanisms also being connected to the body. The lever mechanisms are preferably bell-crank levers. The system may also accommodate a levelling system, and interconnections between fluid volumes of the springs, especially where the members are connected by a member which is rigid in bending but torsionally flexible. The system is particularly useful as a rear suspension for a passenger car.

13 Claims, 2 Drawing Figures

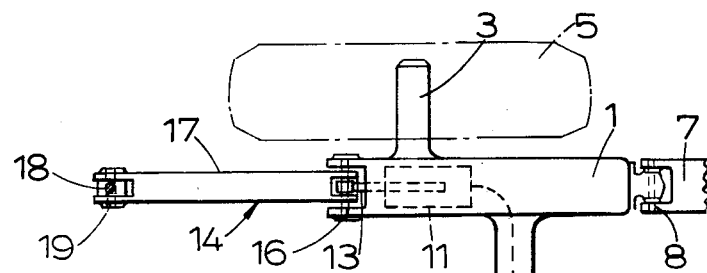
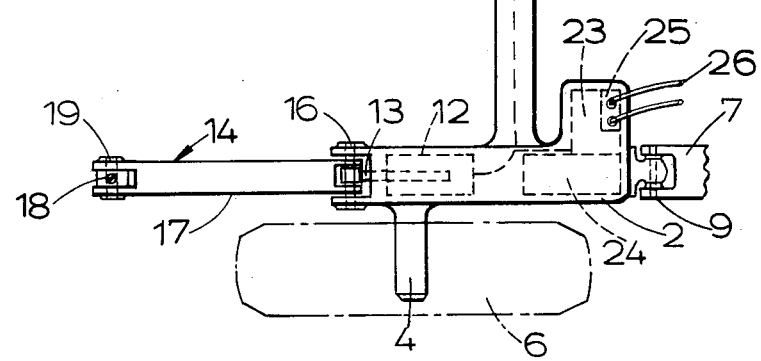

VEHICLE SUSPENSION SYSTEMS

SPECIFIC DESCRIPTION

This invention relates to vehicle suspension systems for pairs of wheels of the kind in which the load on each wheel is supported by a gas spring comprising a volume of gas for supporting the load, to which relative movement of the wheel and vehicle body is transmitted.

The term "gas spring" includes simple gas springs, in which the movement is transmitted directly to the gas volume, gas/hydraulic springs, in which the movement is transmitted through a volume of hydraulic fluid, and combined gas and steel springs, in which a steel spring is combined with a simple gas, or gas/hydraulic spring.

It is convenient to use gas springs or combined gas and steel springs in suspension systems, as they can be designed to provide suspension levelling and frequency control in response to changes in vehicle load. However, they may present problems in design and assembly of the vehicle.

For example, a known rear suspension member is H-shaped, having two torsionally stiff members, each of which carries an axle for its respective rear wheel, connected by a member which is rigid in bending, but is torsionally flexible to allow the rear wheels independent movement in a vertical plane only. If the gas springs are connected between the H-member and the body so that they are vertical they intrude into the passenger compartment, which is undesirable. In order to avoid this they can instead be arranged so that they are substantially horizontal, but it may then be difficult to find the space for this, and for the extra components required to transmit the relative movement of the body and the wheel to the spring.

Further problems arise in connecting the gas spring to the body. If this is to be a direct connection the body has to be sufficiently strong at the connection to take the suspension loads, and the direct connection tends to transmit noise into the body. If the springs are gas/hydraulic springs they may incorporate dampers, which exacerbates the noise problem. The flexible rubber mounts which are normally used to absorb the noise cannot transmit the suspension loads. In one solution to these problems the springs are connected not directly to the body, but to a subframe which is then connected to the body by flexible rubber mounts. However, this has the disadvantage of complicating assembly, and taking up space, as well as increasing the cost. An alternative solution is to mount the spring directly by larger and more expensive mounts which can transmit suspension loads and absorb noise. This provides simpler assembly, and so may be acceptable, even though the body has to take the loads directly.

Further, where gas/hydraulic springs are used, the roll stiffness of the springs increases with an increase in vehicle load, which tends to create undesirable steering characteristics. It is possible to overcome this by connecting the fluid volumes of the rear gas springs, to ensure that the roll stiffness of the springs is not affected by the load, and then providing a torsion bar to provide a constant roll stiffness characteristic. This also involves extra components, and complicates assembly of the vehicle.

According to our invention, a vehicle suspension system of the kind set forth includes two torsionally stiff members, each of which carries an axle for a respective wheel, and a gas spring for connection to the vehicle body is mounted from, and substantially parallel to each of the torsionally stiff members, lever means being provided to transmit relative movement of the wheel and body to the springs, the lever means also being connected to the vehicle body.

This arrangement has the advantage of conserving space and simplifying assembly of the suspension system, as the springs are mounted horizontally, but no subframe is required.

Preferably, the gas springs are mounted in their respective torsionally stiff members, which are connected to the vehicle body.

The lever means and the torsionally stiff members are preferably connected to the vehicle body by flexible rubber mounts. The torsionally stiff members are preferably connected directly to the vehicle body. The lever means may also be connected directly, or through a link.

Any of these arrangements means that the gas springs are connected indirectly to the vehicle body, which overcomes the problem of noise transmission without using special mounts or a subframe, again simplifying assembly.

Further, the connections between the body and the lever means, and the body and the torsionally stiff members may be spaced to spread the suspension loads over the body, thus enabling the body to be lighter.

Preferably the lever means comprises a bell-crank pivoted on the torsionally stiff member, with a first arm connected to the body, and a second arm acting on the spring.

Preferably, the two torsionally stiff members are connected by a member which is rigid in bending, but is torsionally flexible. Where gas/hydraulic springs are used, this member may accommodate a fluid connection between the fluid volumes of the springs. The member itself, being torsionally flexible, may also act as a torsion bar, so that the undesirable handling characteristics which result from using gas/hydraulic springs can be overcome without adding extra components.

The system may also incorporate a levelling system. Thus, levelling sensors may be incorporated on the torsionally stiff members to sense the position of the second arm of the bell-crank, or a member in the spring on which the bell-crank acts. The torsionally flexible member conveniently accommodates signalling wires for the levelling system.

Furthermore, the reservoir for the gas springs and the power source necessary for a levelling system may also be incorporated in the torsionally stiff members and/or in the torsionally flexible member.

Thus, the whole suspension system, including gas springs, levelling and frequency control systems may be incorporated in a single assembly which can be installed very easily in the vehicle. It is of particular advantage when used as the rear suspension system of a passenger car or other light vehicle.

One embodiment of our invention is illustrated in the accompanying drawings, in which FIG. 1 is a plan view of a vehicle suspension system according to our invention; and FIG. 2 is a side view of the assembly of FIG. 1.

The system shown in the drawings is a rear suspension system for a passenger car. The system has two torsionally stiff box-section members 1, 2, each of which carries a respective axle 3, 4 for a rear wheel 5, 6. Each member 1, 2 is connected to the vehicle body 7 by respective flexible rubber mounts 8, 9. The box-section members 1, 2 are connected by a member 10 of U-section which is rigid in bending but torsionally flexible, to allow independent movement of the wheels in a vertical plane only.

Gas springs 11, 12 are mounted in each of the box-section members 1, 2. The springs are therefore horizontal, and do not intrude into the load space of the vehicle. The gas springs are of the gas/hydraulic type, in which a volume of gas supports the load on the wheel, and relative movement of the body and the wheel is transmitted to the gas through a volume of hydraulic fluid. The springs may however be simple gas springs, or combined gas and steel springs.

Each spring 11, 12 has a rod 13 through which relative movement of the body and the respective wheel 5, 6 is transmitted to the spring. The spring 11, 12 incorporate damping means in any known manner.

Relative movement of the wheel and body is transmitted to each rod 13 by a lever means 14. Each lever means 14 comprises a bell-crank 15 which is pivoted at 16 to the respective member 1 or 2. A first arm 17 of the bell-crank 15 is connected to the body 7 through a link 18, a rubber mount 19 being provided between the arm 17 and the link 18, with a second rubber mount 20 between the link 18 and the body 7. The second arm 21 of the bell-crank 15 acts on the rod 13. It can be seen that relative movement of the wheel 5 or 6 and the body 7 operates the bell-crank 15 to act on the spring 11 or 12.

The connections between the members 1, 2 and the body 7, and between the bell-cranks 15 and the body are spaced apart in order to spread the suspension load on the vehicle body. Further, the connections between the springs 11, 12 and the body 7 are indirect. This means that noise and large suspension loads are not transmitted directly to the body, so that no subframe is needed and the rubber mounts 8, 9 and 20 can be of the ordinary flexible kind.

The dimensions of the gas springs 11, 12 can be chosen so that the springs are compact and of minimal friction. This means that the bell-cranks 15 must apply relatively large forces to operate the springs, and the pivot 16 has to have a metal bearing. While this bearing creates extra noise, it is not transmitted directly to the body 7, but is absorbed by the rubber mounts.

The hydraulic volumes of the gas springs 11, 12 are connected by a pipe 22, which is located in the U-section member 10 to protect it from fracture. Interconnection of the fluid volumes means that the roll stiffness of the springs 11, 12 is not affected by the load on them. The necessary roll stiffness for the suspension is instead provided by the U-section member 10 which, being torsionally flexible, can act as a torsion bar. The dimensions of the member 10 are chosen to provide the required roll characteristics for the suspension. This arrangement overcomes the disadvantage of having the springs 11, 12 separate, when increases in the vehicle load increase the roll stiffness of the springs, leading to undesirable handling characteristics.

The suspension system shown also incorporates a suspension levelling and frequency control system which controls the springs in response to load changes. Levelling sensors (not shown) may be incorporated on the members 1, 2 to sense the position of the second arm 21 or the rod 13 relative to the member 1, 2. Signalling wires (not shown) for the levelling system may be located in the U-section member 10. As shown, a pump 23, hydraulic fluid reservoir 24 and microprocessor 25 for the levelling system are incorporated in the member 2. In a modification some or all of these components could be located in the member 22. The only external connection required is a single power connection 26.

The system therefore provides a complete assembly which can easily be installed during a manufacture of the vehicle, and easily removed for replacement or servicing when the vehicle is in use.

Thus our invention provides a suspension assembly with gas springs, having desirable handling, noise damping and load characteristics, which is also extremely compact and simple to install in a vehicle.

I claim:

1. A suspension system for a pair of wheels of a vehicle, said vehicle having a body, and said pair of wheels comprising first and second wheels, said system comprising first and second torsionally stiff members, each said torsionally stiff member being connected to said body, said first torsionally stiff member carrying an axle for said first wheel, and said second torsionally stiff member carrying an axle for said second wheel, first and second gas springs, each said gas spring having a volume of gas for supporting the load on a respective wheel, said first gas spring being mounted in said first torsionally stiff member and said second gas spring being mounted in said second torsionally stiff member, and lever means for transmitting relative movement of said body and said first wheel to said first gas spring, and for transmitting relative movement of said body and said second wheel to said second gas spring, said lever means also being connected to said body, and comprising first and second levers, said first lever having a pivotal connection to said first torsionally stiff member, a first point, spaced from said pivotal connection, for connection to said body and a second point, spaced from said first point and said pivotal connection, at which said first lever acts on said first gas spring, said second lever having a pivotal connection to said second torsionally stiff member, a first point, spaced from said pivotal connection, for connection to said body, and a second point, spaced from said first point and said pivotal connection, at which said second lever acts on said second gas spring.

2. A vehicle suspension system as claimed in claim 1, wherein said first and second levers and said first and second torsionally stiff members are connected to said vehicle body by flexible rubber mounts.

3. A vehicle suspension system as claimed in claim 1, wherein said torsionally stiff members are connected directly to said vehicle body.

4. A vehicle suspension system as claimed in claim 1, wherein said first and second levers are connected directly to said vehicle body.

5. A vehicle suspension system as claimed in claim 1, wherein each of said first and second levers is connected to said vehicle body through a link.

6. A vehicle suspension system as claimed in claim 1, wherein said connections between said body and said first and second levers, and said body and said torsionally stiff members are spaced apart to spread the suspension loads over said body.

7. A vehicle suspension system as claimed in claim 1, wherein said first and second levers comprise first and second bell-cranks, each said bell-crank having said pivotal connection to its respective said torsionally stiff member, each said bell-crank having a first arm on which said first point is located, and a second arm on which said second point is located.

8. A vehicle suspension system as claimed in claim 1, wherein said first and second torsionally stiff members are connected by a member which is rigid in bending, but is torsionally flexible.

9. A vehicle suspension system as claimed in claim 8, wherein gas/hydraulic springs are used each gas/hydraulic spring having a fluid volume, and said torsionally flexible member accommodates a fluid connection between said fluid volumes of said gas/hydraulic springs.

10. A vehicle suspension system as claimed in claim 8, wherein a levelling system is incorporated, and said torsionally flexible member accommodates signalling wires for said levelling system.

11. A vehicle suspension system as claimed in claim 10, wherein a reservoir for said gas springs and a power source for said levelling system are incorporated in said torsionally stiff members and/or in the torsionally flexible member.

12. A vehicle suspension system as claimed in claim 1, which incorporates a levelling system with levelling sensors are incorporated on each said torsionally stiff members to sense the position of said lever means or a member in a respective said spring on which said lever means acts.

13. A vehicle suspension system as claimed in claim 1, adapted for use as the rear suspension system for a passenger car or other light vehicle.

* * * * *